United States Patent
Brauer

Patent Number: 5,203,104
Date of Patent: Apr. 20, 1993

[54] NONSUBMERSIBLE FISHING ROD AND REEL

[76] Inventor: Aaaron A. Brauer, P.O. Box 232, Stockton, Mo. 65785

[21] Appl. No.: 874,130

[22] Filed: Apr. 24, 1992

[51] Int. Cl.⁵ .............................................. A01K 87/00
[52] U.S. Cl. ................................................ 43/23; 43/24
[58] Field of Search ............. 43/18.1, 23, 24, 25, 43/25.2, 18.5, 19, 54.1, 57.1

[56] References Cited

U.S. PATENT DOCUMENTS

| | | | |
|---|---|---|---|
| 2,700,787 | 2/1955 | Trapanese | 43/25 |
| 3,466,783 | 9/1979 | Priebe, Jr. | 43/23 |
| 3,500,572 | 3/1970 | Johnson | 43/23 |
| 4,014,129 | 3/1977 | Capra | 43/23 |
| 4,467,548 | 8/1984 | Tabor | 43/23 |
| 4,582,758 | 4/1986 | Bruce et al. | 43/18.1 |
| 4,702,031 | 10/1987 | Sousa | 43/24 |
| 4,944,111 | 7/1990 | Daniel | 43/25.2 |

*Primary Examiner*—Richard K. Seidel
*Assistant Examiner*—Chuck Y. Mah
*Attorney, Agent, or Firm*—S. Michael Bender

[57] ABSTRACT

A fishing rod and reel combination including means for preventing the rod and reel from submerging should it accidentally be dropped or otherwise placed in water.

14 Claims, 4 Drawing Sheets

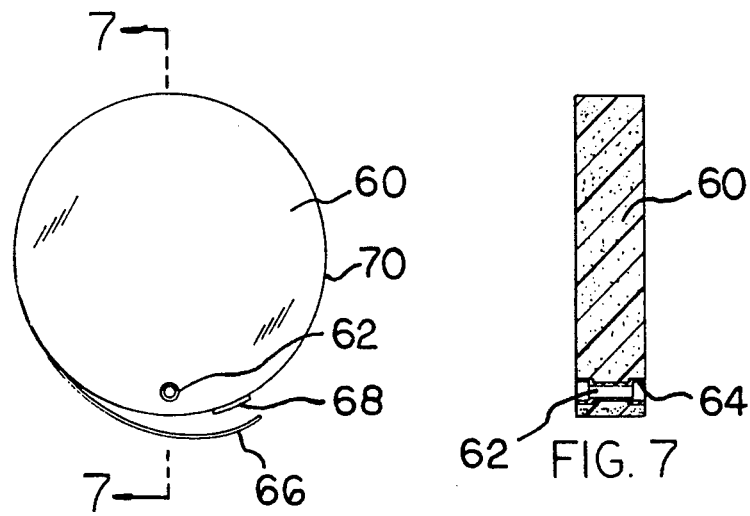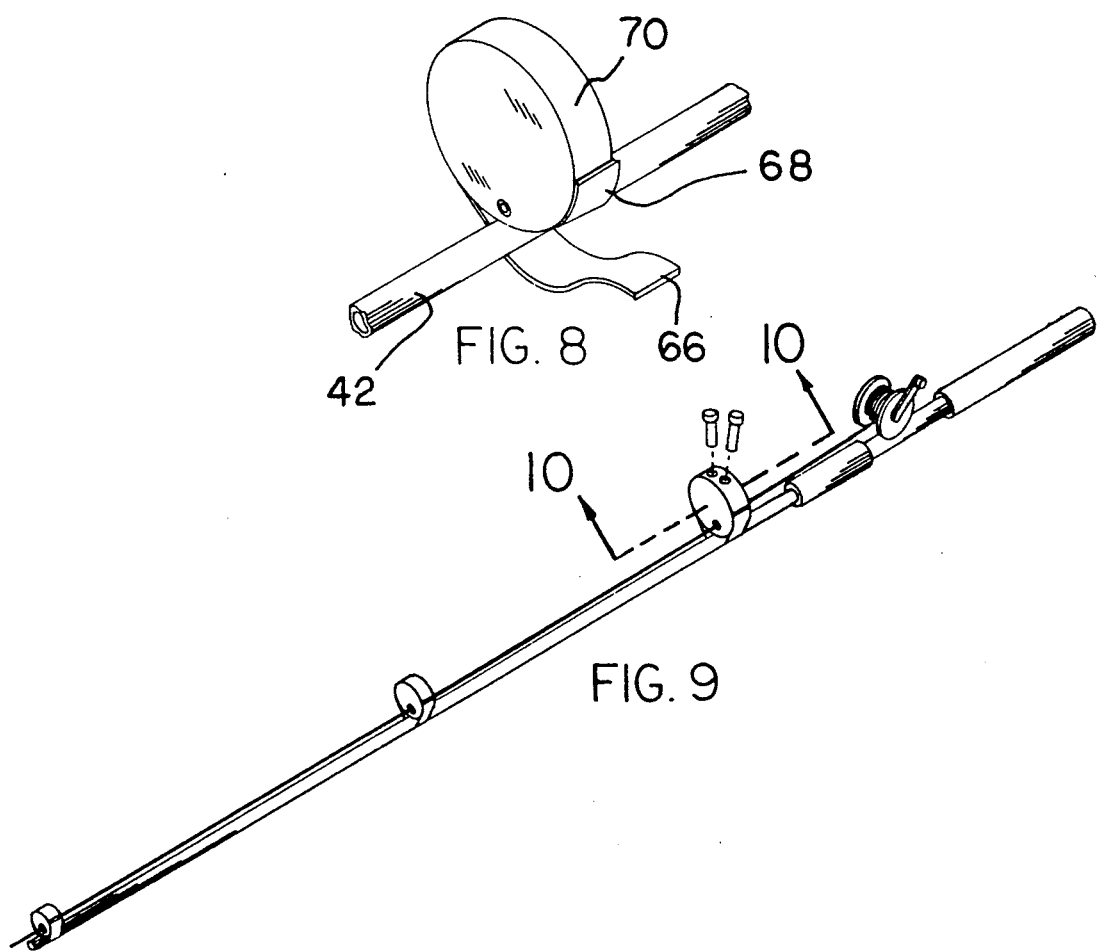

NONSUBMERSIBLE FISHING ROD AND REEL

BACKGROUND OF THE INVENTION

1. Field of the Invention

The present invention relates generally to fishing rods and reels, and more particularly to a new and improved fishing rod and reel combination incorporating means for preventing submersion of the rod and reel in water or the like.

2. Description of the Prior Art

Practically all fishermen have been vexed at one time or another by the problem of accidentally dropping a fishing rod into the water and having the rod quickly sink below the surface of the water, making retrieval difficult, if not impossible. Although various prior art solutions to this longstanding problem have been proposed in the past, they have been, until the present invention, less than entirely satisfactory. For example, U.S. Pat. No. 4,869,011 discloses a fishing rod having a hollow handle for housing a knife and a buoyant covering on the handle of the rod ostensibly to keep it afloat. However, because of the weight of the rod and reel and the fact that water can easily seep into the hollow handle, the buoyant covering must be unreasonably thick thus rendering this patented fishing rod too bulky and difficult to handle.

Other prior devices merely provide means for locating the submerged fishing rod. For example, U.S. Pat. No. 3,624,849 discloses a housing which may be attached to a fishing rod. Should the combination sink, the water will eventually dissolve glue holding the housing together thereby releasing a float member which rises to the surface to indicate the location of the sunken rod. Similarly, U.S. Pat. No. 4,713,031 discloses a housing attachable to a fishing rod and which includes a spring biased "bobber" captured within the housing (and attached thereto via a spooled line) by a water dissolvable material, e.g., an aspirin tablet. If and when this combination sinks below the surface of the water, the aspirin tablet is caused to dissolve thereby releasing the spooled line and enabling the "bobber" to float to the surface to indicate the submerged rod's location.

Finally, devices are known for housing a plurality of conventional fishing rod and reel combinations wherein the housing device generally is fabricated of nonsubmersible material. For example, U.S. Pat. No. 4,858,366 shows a fishing rod carrier comprising a rigid body of buoyant material, e.g. foamed thermoplastic, wherein the carrier includes a series of tubular members for housing a corresponding number of fishing rods. However, this device is totally ineffective in preventing unintended submersal of the various fishing rods after they have been removed from the carrier.

SUMMARY OF THE INVENTION

The disadvantages of the prior art devices described above are overcome by the present invention which, briefly described, relates to a fishing rod and reel combination incorporating several different means for maintaining the fishing rod and reel afloat or nonsubmersible in water. First, there is provided in the handle of the fishing rod a core of filler material having buoyancy characteristics. Second, the reel of the fishing rod is made water-tight by the provision of sealing gaskets and O-rings in the housing. Finally, unique fishing tackle eyelet guide means are provided adapted to be adjustably positioned longitudinally along the fishing rod and which also are fabricated of a buoyancy enhancing material. In an alternative embodiment, the guide means are fitted with canister inserts thus serving the dual function of providing a convenient storage place for live bait.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least two embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which only is measured by the claims, nor is it intended to be limiting as to the scope of the invention in any way.

It is therefore an object of the present invention to provide a new and improved nonsubmersible fishing rod and reel which has all the advantages of the prior art and none of the disadvantages.

It is another object of the present invention to provide a new and improved nonsubmersible fishing rod and reel which may be easily and efficiently manufactured and marketed.

It is a further object of the present invention to provide a new and improved nonsubmersible fishing rod and reel which is of a durable and reliable construction.

An even further object of the present invention is to provide a new and improved nonsubmersible fishing rod and reel which is susceptible of a low cost of manufacture with regard to both materials and labor, and which accordingly is then susceptible of low prices of sale to the consuming public, thereby making such nonsubmersible fishing rod and reel economically available to the buying public.

Still yet another object of the present invention is to provide a new and improved nonsubmersible fishing rod and reel which provides in the apparatuses and methods of the prior art some of the advantages thereof, while simultaneously overcoming some of the disadvantages normally associated therewith.

Still another object of the present invention is to provide a new and improved fishing rod and reel incorporating means for preventing submersion thereof in water.

It is yet still another object of the present invention to provide a new and improved fishing rod and reel combination having buoyancy enhancing means, and in which part of the buoyancy enhancing means provides storage means for live bait.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein:

FIG. 6 is a front elevational view of one of the tackle guide means of FIG. 5.

FIG. 7 is a cross-sectional view of the tackle guide means of the present invention taken along line 7—7 of FIG. 6.

FIG. 8 is an enlarged perspective view showing the installation of the tackle guide means of the invention.

FIG. 9 is a perspective view of an alternative embodiment of the invention showing the tackle guide means with live bait canister inserts.

DESCRIPTION OF THE PREFERRED EMBODIMENT

With reference now to the drawings, a new and improved nonsubmersible fishing rod and reel embodying the principles and concepts of the present invention will be described.

Figure 1:
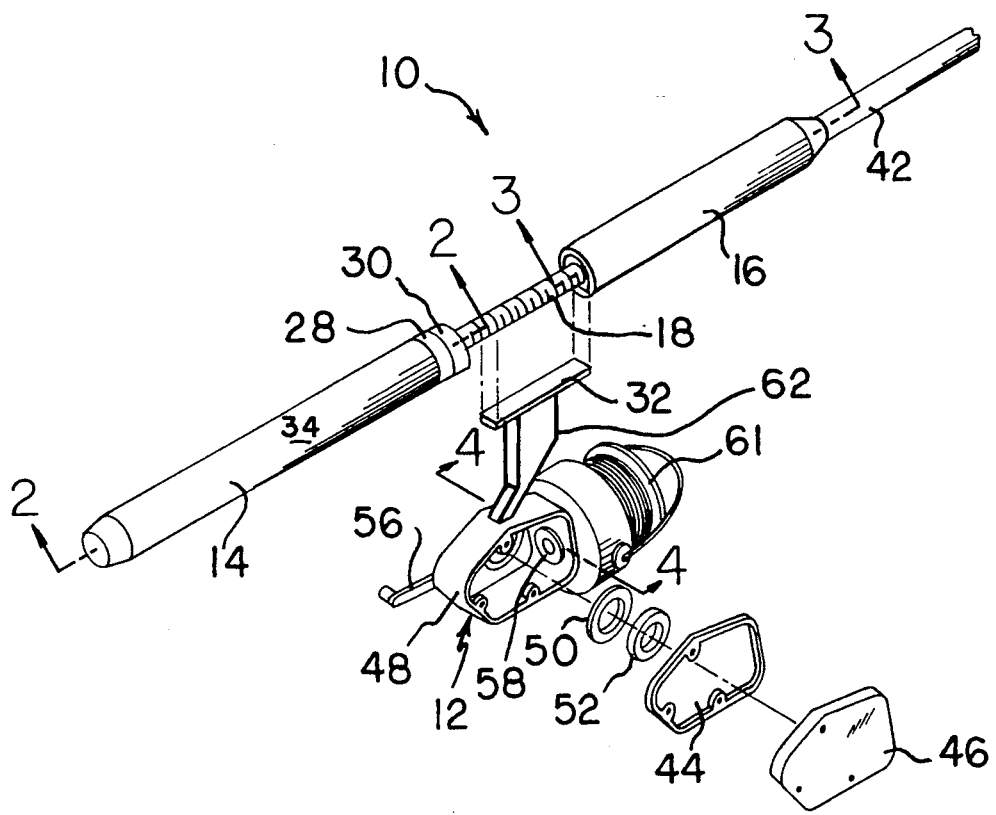
FIG. 1 is a perspective assembly view of a fishing road and reel according to the invention.
Figure 2:
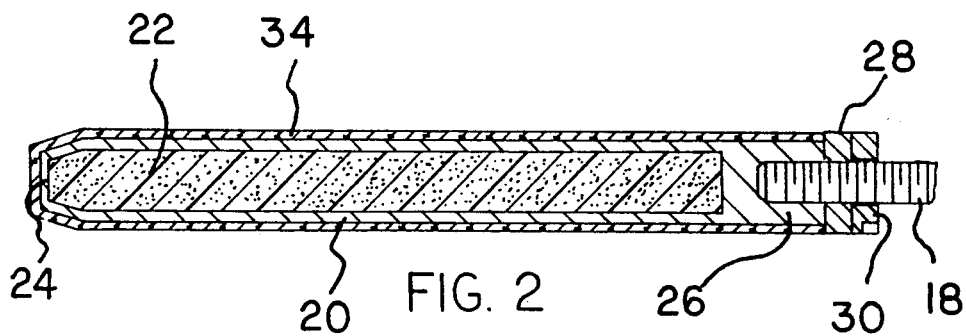
FIG. 2 is a cross-sectional view of the fishing rod and reel of the invention taken along line 2—2 of FIG 1.
Figure 3:
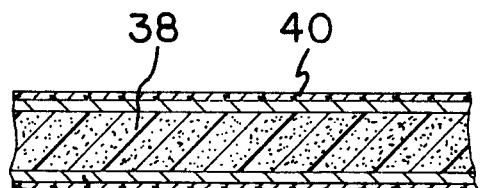
FIG. 3 is a cross-sectional view of the fishing rod and reel of the present invention taken along line 3—3 of FIG. 1.

Turning initially to FIGS. 1-3, there is shown a fishing rod 10 and reel 12. The rod and reel of the preferred embodiment are of the type known as a flycasting rod with a spinning reel; however, it will be appreciated that the principles of the invention are applicable to other types of rods and reels as well. Rod 12 comprises a handle having a first section or butt grip 14 and a second section or foregrip 16 with the first and second sections being separated by a reel mounting section 18 substantially as shown in FIG. 1.

In accordance with the invention, the handle sections are provided with buoyancy enhancing or floatation means in the form of a solid core of suitably buoyant material with styrofoam plastic being mostly preferred. Thus as shown in FIG. 2, "material" not limited to a solid form, but may also be a gas: (e.g. air or helium.) but grip section 14 comprises a hollow tubular member 20 of stiff durable material, preferably aluminum, whose interior is filled with a styrofoam plug or core 22. An end cap 24 is provided at one end of the tubular member 20 to seal the buoyancy plug 22 within the interior cavity of the tubular member. The tubular member at its other end 26 is suitably joined to reel mounting section 18 with the aid of chuck 28. A reel mounting ring 30 for engaging the bracket 32 on reel 12 is normally seated against chuck 28 and can be rotated into locking engagement with the reel bracket as is well known in the art. A similar locking ring is mounted on central section 18 at the other end thereof, but has been omitted from the drawings for the sake of clarity of presentation. Suffice it to say, the reel 12 may be fixedly secured to central section 18 between butt grip section 14 and foregrip section 16 (FIG. 1) as will be apparent to those of ordinary skill in the art.

As best seen in FIG. 2, the exterior surface of tubular member 20 is provided with an outer protective coating or layer 34 of suitable material such as cork or plastic, for example. Such a protective coating facilitates gripping of the handle section and should be water impervious. A particularly preferred material is an open cell polypropylene material as fully described, for example, in U.S. Pat. No. 3,500,572, incorporated herein by this reference.

Foregrip section 16 is similar in construction to butt grip section 14. Thus, as shown in FIG. 3, foregrip section 16 comprises a hollow, tubular member 36; a buoyant filler member in the form of a styrofoam plastic core or plug 38 disposed in and filling the cavity of tubular member 36; and an outer protective covering or layer 40, preferably of the same material as protective covering 34. The usual fishing rod pole or elongated section 42 is joined to the end of foregrip section 16 opposite to the other end thereof attached to central section 18 in a suitable manner well known in the art.

In accordance with the present invention, the provision of cores 22, 38 of buoyant enhancing material in butt grip section 14 and foregrip section 16 prevents submersion of the fishing rod in water should the rod accidentally be dropped or otherwise placed in water. Nonetheless, the anti-submerging action of buoyancy cores 22, 38 could be mitigated somewhat should the reel housing fill with water. Thus, in accordance with another feature of the present invention various sealing means are provided in connection with reel 12 as will now be described in connection with FIGS. 1 and 4.

Figure 4:
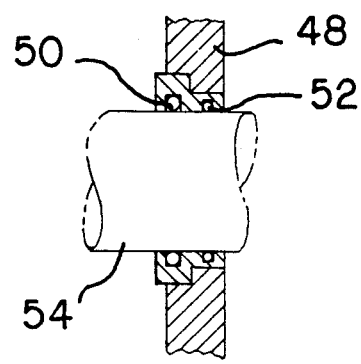
FIG. 4 is an enlarged cross-sectional view of the fishing rod and reel of the present invention taken along line 4—4 of FIG. 1.

As shown in FIG. 1, a first sealing gasket 44 is disposed between the reel cover plate 46 and the reel housing 48. Moreover, a pair of O-ring seals 50, 52 are suitably provided on the drive shaft 54 of reel crank 56 (FIG. 4). A similar pair of O-rings only one of which is diagrammatically indicated by reference numeral 58 in FIG. 1, is provided on the axis of spool 60 of reel 12. By the use of sealing gasket 44 and O-ring seals 50, 52, 58 the interior of reel housing 48 may be rendered watertight thus enhancing the buoyancy or nonsubmersible characteristics of the fishing rod and reel combination contemplated by the present invention. 62 reel stem is elongated and hollow to further enhance nonsubmersible characteristics.

Figure 5:
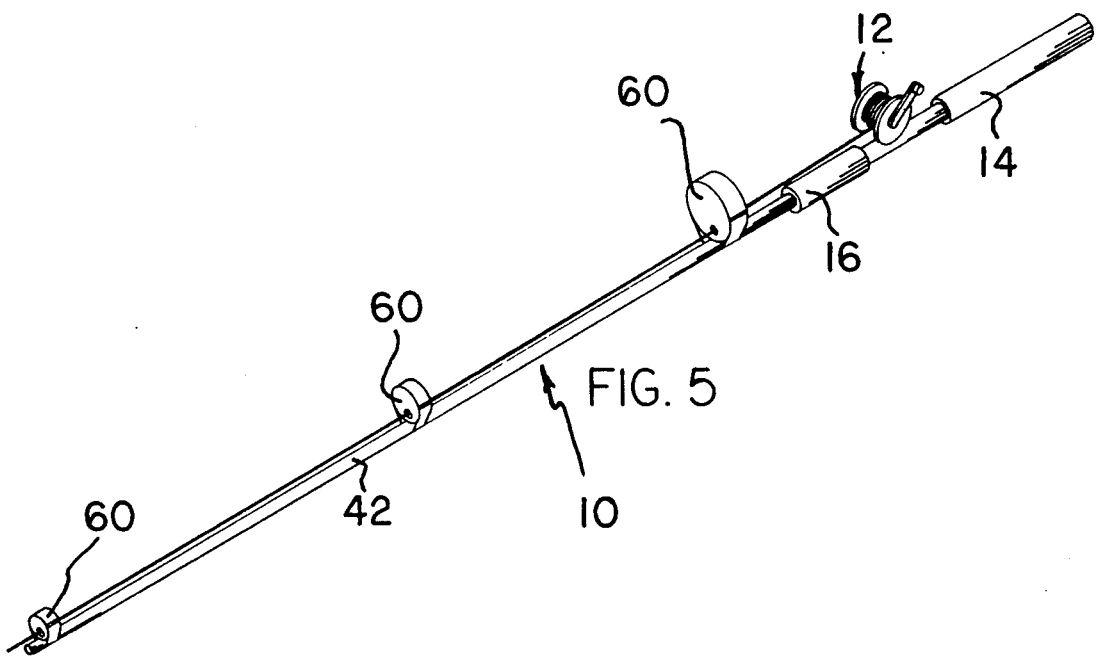
FIG. 5 is a perspective view of the fishing rod and reel of the present invention showing the installation of tackle guide means.

Turning now to FIGS. 5-8, further buoyancy enhancing means are provided in the form of floatation collars 60 which also serve as fishing line eyelet guides. The collars 60 which preferably vary in size from a minimum diameter positioned near the distal end of pole 42 to a maximum diameter used proximal to foregrip section 16 (FIG. 5) each comprise a solid disc of buoyant material, preferably styrofoam plastic, having a grommet 62 press-fit into through bore 64 located substantially as shown in FIGS. 6 and 7 near bottom dead center of each disc. A pair of mating flexible fabric fastener elements 66, 68 such as that sold under the Registered Trademark VELCRO are attached, preferably using a suitable adhesive, to the peripheral surface 70 of each disc as best seen in FIG. 6. The discs 60 are installed in suitable positions along the longitudinal extent of pole section 42 by wrapping a fastener element 66 around the underside of the pole and engaging mating fastener element 68 as diagrammatically illustrated in FIG. 8. The fishing line from spool 61 of reel assembly 12 may then be threaded through grommets 62 (FIG. 5). It will thus be appreciated that discs 60 because of their buoyancy characteristics not only further enhance the nonsubmersible attributes of the fishing rod and reel combination of the present invention, but furthermore, serve as fishing line eyelet guides as well.

Figure 10:
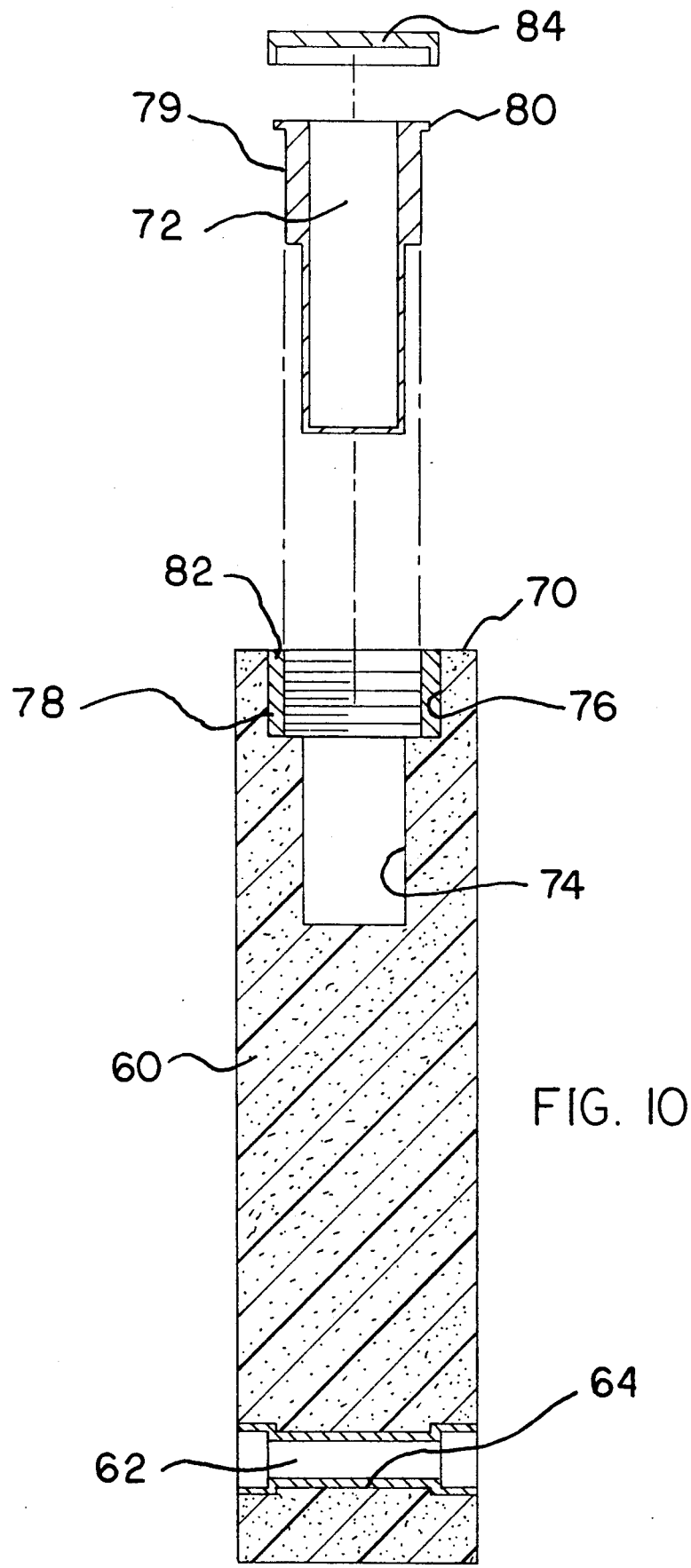
FIG. 10 is an enlarged cross-sectional view of the alternative form of tackle guide means taken along line 10—10 of FIG. 9.

In an alternative preferred form of the present invention, the floatation collars or discs 60 may be modified to provide convenient means for storing live bait. Thus, as shown in FIGS. 9 and 10, a series of vials or canisters 72 are radially inserted into the peripheral surface 70 of the largest diameter disc 60. A radial recess 74 is provided with a countersink portion 76 into which a female threaded collar 78 is pressfit or secured by a suitable adhesive. Vial or container 72 has an upper outer surface 78 having male threads thereon for interengagement with collar 78 when the vial is inserted into recess 74 and screwed into position with the vial body reposing in recess 74 and a flanged-lip portion 80 terminating the upper portion of the vial seating on upper surface 82 of collar 78. A cap 84 for vial 72 is provided for snap-fitment with flanged-lip portion 80. It will thus be seen that live bait (e.g. worms) may be placed in vial or canister 72 and the cap 84 snapped into place thereby providing convenient access thereto. Due to the insulative properties of the styrofoam disc material the lifetime and vigor of the live bait will be extended substantially. Obviously, the exact number of vials 72 provided in each disc 60 is a matter of choice.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. An article of manufacture comprising:
   a fishing rod having a handle at one end thereof, and
   floatation means associated with said handle to render said fishing rod nonsubmersible in water, said floatation means comprising a filler member of buoyant material in at least a portion of said handle,
   reel means having fishing line thereon provided on said fishing rod near said handle, and
   wherein said fishing rod further comprises at least one floatation collar mounted therein, said floatation collar serving as eyelet guide means for the fishing line contained on said reel means.

2. The article of manufacture of claim 1 wherein said at least one floatation collar also comprises buoyant material and said buoyant material is "styrofoam" plastic.

3. The article of manufacture of claim 1 wherein said reel means comprises a watertight housing.

4. An article of manufacture comprising:
   a fishing rod having a handle at one end thereof, and
   floatation means associated with said handle to render said fishing rod nonsubmersible in water, said floatation means comprising a filler member of buoyant material in at least a portion of said handle,
   reel means provided on said fishing rod near said handle, said reel means having a watertight housing,
   wherein said fishing rod further comprises at least one floatation collar; said floatation collar comprises a disc of buoyant material, eyelet means disposed in said disc in the vicinity of the peripheral edge thereof, and fastener means for attaching said disc to said fishing rod with the portion of said disc containing said eyelet means being located proximal to said fishing rod.

5. The article of manufacture of claim 4 wherein said floatation collar peripheral edge includes at least one recess therein, and container means disposed in said recess for storing live bait.

6. The article of manufacturer of claim 4 wherein said buoyant disc is "styrofoam" plastic.

7. A floatation collar for a fishing rod comprising:
   a disc of buoyant material, said disc having a pair of opposed sides and a peripheral edge,
   a bore disposed in said disc extending from one opposed side to the other, the axis of said bore being located proximal to said peripheral edge,
   a fastener element attached to said disc peripheral edge wherein said disc adapted to be mounted on a fishing rod with said bore extending through said disc being located proximal to said fishing rod such that said bore serves as the eyelet guide means for said fishing rod.

8. The floatation collar of claim 7 wherein said bore includes a grommet disposed therein.

9. The floatation collar of claim 7 wherein said buoyant material is "styrofoam" plastic.

10. The floatation collar of claim 7 wherein said fastener element comprises a pair of sections of "VELCRO" material attached to the peripheral edge of said disc in the vicinity of said bore.

11. The floatation collar of claim 7 wherein said disc peripheral edge has a recess extending radially from said edge toward the central axis of said disc, and said recess has a tubular member received therein, said tubular member serving as a container for live bait.

12. The floatation collar of claim 11 wherein said tubular member further includes cap means for removably sealing said container.

13. The floatation collar of claim 11 wherein said recess includes a threaded collar secured therein, and said tubular member has a threaded external surface for engagement with said threaded collar when said tubular member is received in said recess.

14. The floatation collar of claim 13 wherein said tubular member has a flanged lip at one end thereof, said flanged lip engaging said peripheral edge of said disc when said tubular member is received therein, said invention further comprising sealing cap means for snap fit engagement with said flanged lip.

* * * * *